US009393959B2

(12) United States Patent
Fassbender

(10) Patent No.: US 9,393,959 B2
(45) Date of Patent: Jul. 19, 2016

(54) METHOD AND CONTROL UNIT FOR OPERATING A DYNAMICS CONTROL SYSTEM OF A VEHICLE AS WELL AS A CONTROL SYSTEM FOR DYNAMICS CONTROL OF A VEHICLE USING SURROUNDINGS SENSOR DATA

(75) Inventor: Bjoern Fassbender, Stuttgart (DE)

(73) Assignee: ROBERT BOSCH GMBH, Stuttgart (DE)

(*) Notice: Subject to any disclaimer, the term of this patent is extended or adjusted under 35 U.S.C. 154(b) by 60 days.

(21) Appl. No.: 14/351,650

(22) PCT Filed: Aug. 30, 2012

(86) PCT No.: PCT/EP2012/066896
§ 371 (c)(1),
(2), (4) Date: Jul. 29, 2014

(87) PCT Pub. No.: WO2013/060512
PCT Pub. Date: May 2, 2013

(65) Prior Publication Data
US 2014/0358328 A1    Dec. 4, 2014

(30) Foreign Application Priority Data
Oct. 25, 2011  (DE) .......................... 10 2011 085 140

(51) Int. Cl.
*B60R 22/00*  (2006.01)
*B60W 30/09*  (2012.01)
*B60T 8/1755*  (2006.01)

(52) U.S. Cl.
CPC ............ *B60W 30/09* (2013.01); *B60T 8/17558* (2013.01); *B60T 2201/022* (2013.01); *B60T 2210/32* (2013.01); *B60T 2220/02* (2013.01)

(58) Field of Classification Search
CPC .................................................... B60W 30/09

USPC ................... 701/1, 36, 41, 45, 96, 117–119, 701/330–302; 340/435, 903
See application file for complete search history.

(56) References Cited

U.S. PATENT DOCUMENTS

| 6,035,053 | A  | * | 3/2000  | Yoshioka et al. | ............. 382/104 |
| 6,463,372 | B1 | * | 10/2002 | Yokota et al.   | ................... 701/45 |
| 8,086,406 | B2 | * | 12/2011 | Ewerhart et al. | ............. 701/301 |
| 8,392,104 | B2 | * | 3/2013  | Nishira et al.  | ................ 701/301 |
| 2006/0195231 | A1 |  | 8/2006 | Diebold et al. | |

FOREIGN PATENT DOCUMENTS

| CN | 101475002 A   | 7/2009  |
| DE | 10 2009 031368 | 1/2011  |
| EP | 1 355 209     | 10/2003 |
| EP | 1 818 231     | 8/2007  |
| WO | 2004/085220   | 10/2004 |

* cited by examiner

*Primary Examiner* — Luke Huynh
(74) *Attorney, Agent, or Firm* — Norton Rose Fulbright US LLP

(57) ABSTRACT

A method for operating a control system for dynamics control of a vehicle, in particular a motor vehicle, which includes: detecting an object with the aid of at least one surroundings detection device which detects a detection area in the vehicle surroundings, determining the probability of an interaction, between the vehicle and the object, to cause damage to the vehicle or its occupants, and changing the intensity of a control intervention by the vehicle dynamics control system as a function of the previously determined probability of an interaction between the vehicle and the object in at least one operating mode of the control system, the vehicle dynamics control system being a vehicle dynamics control system for preventing a lateral breakaway of the vehicle. Also described is a corresponding control unit and control system.

11 Claims, 3 Drawing Sheets

METHOD AND CONTROL UNIT FOR OPERATING A DYNAMICS CONTROL SYSTEM OF A VEHICLE AS WELL AS A CONTROL SYSTEM FOR DYNAMICS CONTROL OF A VEHICLE USING SURROUNDINGS SENSOR DATA

FIELD OF THE INVENTION

The present invention is directed to a method for operating a control system for dynamics control of a vehicle, in particular a motor vehicle. The present invention is furthermore directed to a control unit which is configured to operate a control system for dynamics control of a vehicle, in particular a motor vehicle, according to such a method. Finally, the present invention is directed to a corresponding control system for dynamics control of a vehicle, in particular a motor vehicle.

BACKGROUND INFORMATION

A vehicle dynamics control system such as the electronic stability program (ESP) is present in many motor vehicles nowadays and is considered to be an integral part of the active safety systems in the vehicle. ESP refers to a control system in the braking system and in the drive train of a vehicle which counteracts the lateral breakaway of the vehicle by decelerating individual wheels in a targeted manner. In most of these vehicles, the driver is able to change the thresholds of the ESP system or to completely turn off the ESP to be able to either adjust to special situations (e.g., rocking the vehicle free in the snow) or to allow for a more sporty type of driving.

As a result of this reduced or deactivated protection, the accident risk may, however, also rise if the vehicle is not sufficiently controlled by the driver or the driver incorrectly assumes that the system is active (for example, if the driver forgets to activate it or turns it off inadvertently).

SUMMARY OF THE INVENTION

The method according to the present invention having the features described herein, the control unit according to the present invention having the features described herein, as well as the system according to the present invention having the features described herein offer the advantage that a collision risk is minimized even though the driving experience is largely freed of noticeable control interventions by the control system.

The following steps are provided in the method according to the present invention: (a) detecting an object with the aid of at least one surroundings detection device detecting a detection area in the vehicle surroundings, (b) determining the probability of an interaction, between the vehicle and this object, to cause damage to the vehicle or its occupants, and (c) changing the intensity of a control intervention by the vehicle dynamics control system as a function of the previously determined probability of an interaction between the vehicle and the object in at least one operating mode of the control system. The vehicle dynamics control system is a vehicle dynamics control system for preventing a lateral breakaway of the vehicle. The interaction is in particular a collision of the vehicle with the object.

The control system for vehicle dynamics control is to be understood as a control system which intervenes into the braking system and into the drive system (the drive train) of a vehicle and, for example, counteracts the lateral breakaway of the vehicle by decelerating individual wheels in a targeted manner. Such a control system is also known as an ESP (electronic stability program) control system.

The determination of the probability of an interaction may be limited to the determination of a possibility of this interaction, i.e., to whether the probability of the interaction is above or below a probability limit or threshold. The interaction between the vehicle and the object is in particular a collision of the vehicle with this object. Such a determination of the probability or the possibility of an interaction with an object is known in this context from other driver assistance systems having ACC (adaptive cruise control) plus.

The change in the intensity of the control intervention may, for example, include a change in the retardation of the control intervention and/or a change in the intensity of the control intervention.

In particular, the change in the intensity of the control intervention, e.g., by setting intensity thresholds, is a settable change in the intensity of the control intervention.

In one embodiment of the present invention, it is advantageously provided that the change in the intensity of the control intervention by the vehicle dynamics control system includes an activation or a deactivation of the vehicle dynamics control system. In the simplest case, the change in the intensity of the control intervention by the vehicle dynamics control system is merely this activating or deactivating of the vehicle dynamics control system.

In another embodiment of the present invention, it is provided that the detection of the object is an ascertainment of a position and/or a speed and/or an acceleration of the object relative to the vehicle.

According to one refinement of the present invention, the surroundings detection device is a surroundings detection device of a driver assistance system of the vehicle.

According to another advantageous embodiment of the present invention, it is provided that the surroundings detection device is a visual and/or an acoustic sensor, in particular a sensor of a radar system and/or a sensor of an infrared vision system and/or a camera of a video system and/or a sensor of an ultrasonic system.

Sensors of this type are already used in vehicles in the adaptive cruise control (ACC), the lane departure warning, the night vision support, the collision warning, etc.

According to another advantageous refinement of the present invention, it is provided that the determination of the probability of an interaction between the vehicle and the object is a determination of the probability of an interaction between the vehicle and the object and that the change in the intensity of the control intervention by the vehicle dynamics control system takes place as a function of a preselected probability threshold.

In another embodiment of the present invention, it is provided that the driver of the vehicle selects the at least one operating mode from multiple selectable operating modes.

The control unit according to the present invention, which is configured for operating a control system according to a method mentioned previously, has (i) a device which is configured for determining the probability of an interaction, between the vehicle and an object detected in the vehicle surroundings, to cause damage to the vehicle or its occupants and (ii) a device for changing the intensity of a control intervention by the vehicle dynamics control system in at least one operating mode of the control system. The vehicle dynamics control system is in this case a vehicle dynamics control system for preventing a lateral breakaway of the vehicle.

The control system according to the present invention includes: (i) at least one surroundings detection device, which detects a detection area in the vehicle surroundings, for detecting an object, (ii) a device which is configured for determining the probability of an interaction, between the vehicle and this object, to cause damage to the vehicle or its occupants, and (iii) a device for changing the intensity of a control intervention by the vehicle dynamics control system as a function of the probability of an interaction between the vehicle and the object in at least one operating mode of the control system. The vehicle dynamics control system is a vehicle dynamics control system for preventing a lateral breakaway of the vehicle. It is advantageously provided that the device for changing the intensity of the control intervention by the vehicle dynamics control system is an activation and/or deactivation device for activating or deactivating the vehicle dynamics control system.

Such a surroundings detection device as well as such a device which is configured for determining the probability of an interaction, between the vehicle and this object, to cause damage to the vehicle or its occupants, is in most cases already present in vehicles having driver assistance systems, since the surroundings of the vehicle are detected by the surroundings detection device with regard to such a potential damage. Systems of this type warn the driver of the vehicle and/or decelerate the vehicle to avoid collision, or at least prepare a corresponding braking action.

In one advantageous embodiment of the present invention, it is provided that the surroundings detection device is a visual and/or an acoustic sensor, in particular a sensor of a radar system and/or a sensor of an infrared vision system and/or a camera of a video system and/or a sensor of an ultrasonic system. For example, a far-range radar having a detection range of up to 200 m, a far-/close-range infrared vision system having a night-vision detection range of up to approximately 150 m, ultrasonic systems and video sensors are known.

According to one advantageous embodiment of the present invention, it is provided that the detection of the object is an ascertainment of a position and/or a speed and/or an acceleration of the object relative to the vehicle.

Finally, it is advantageously provided that the system has a selection device for selecting the operating mode from multiple selectable operating modes. Such a selection device may, for example, be implemented as a user interface inside the vehicle.

The present invention is elucidated below in greater detail with reference to the figures.

DETAILED DESCRIPTION

Figure 1:
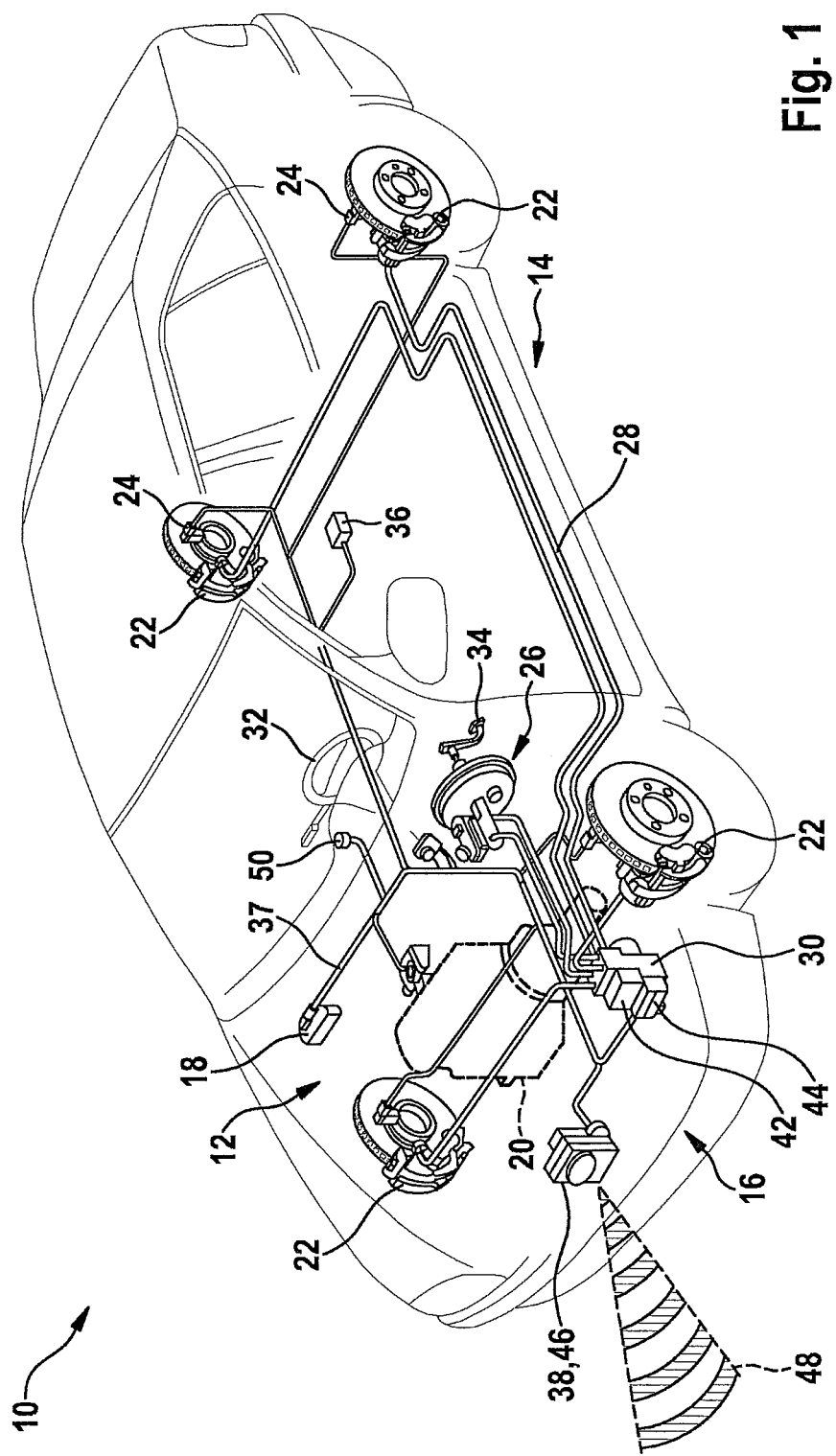
FIG. 1 shows a schematic representation of a vehicle having a control system for dynamics control of a vehicle according to one specific embodiment of the present invention.

FIG. 1 shows a vehicle 10 configured as a motor vehicle having a drive system 12, a braking system 14, and a control system 16, which is connected to these two systems, for dynamics control of vehicle 10. Here, components of drive system 12 and braking system 14 may simultaneously also be a part of control system 16 for controlling the vehicle dynamics. Such a control system 16 is also referred to as an ESP (electronic stability program) system. FIG. 1 shows, for example, the following components used for the vehicle dynamics control system: the components of drive system 12 are control unit 18 of the engine management and engine (internal combustion engine) 20 plus the transmission. The components of braking system 14 are wheel brakes 22 of the wheels, wheel rotational speed sensors 24, a brake booster 26 having a brake master cylinder, a hydraulic system 28, and a control unit 30. Furthermore, the user interfaces (human machine interface) are steering wheel 32 and brake pedal 34 as well as a motion and/or position sensor (yaw-rate sensor with installed transverse acceleration sensor) 36.

Control system 16 influences the drive torque generated by drive system 12 and/or the brake torque (deceleration torque) generated by braking system 14 using corresponding control interventions. In other words, control system 16 for controlling the vehicle dynamics activates control units 18, 30 of drive system 12 and/or braking system 14 in a targeted manner. The communication between the components of different system 12, 14, 16 takes place via a data bus system 37, for example. Control units 18, 30 initiate appropriate measures, for example, the targeted deceleration of individual wheels of vehicle 10 with the aid of separately activatable wheel brakes 22.

The reference variables of control system 16 for controlling the vehicle dynamics are variables which are detected by a sensor and user interfaces (human machine interface) 32, 34 and which allow the driver's intent, such as the steering angle, the brake or the accelerator pedal position, for example, to be noticed. Other reference variables of this control system 16 are variables which are detected by sensor 36 and which detect the actual driving behavior of vehicle 10, e.g., a yaw rate, a transverse acceleration, a wheel rotational speed, and a brake pressure.

Figure 2B:
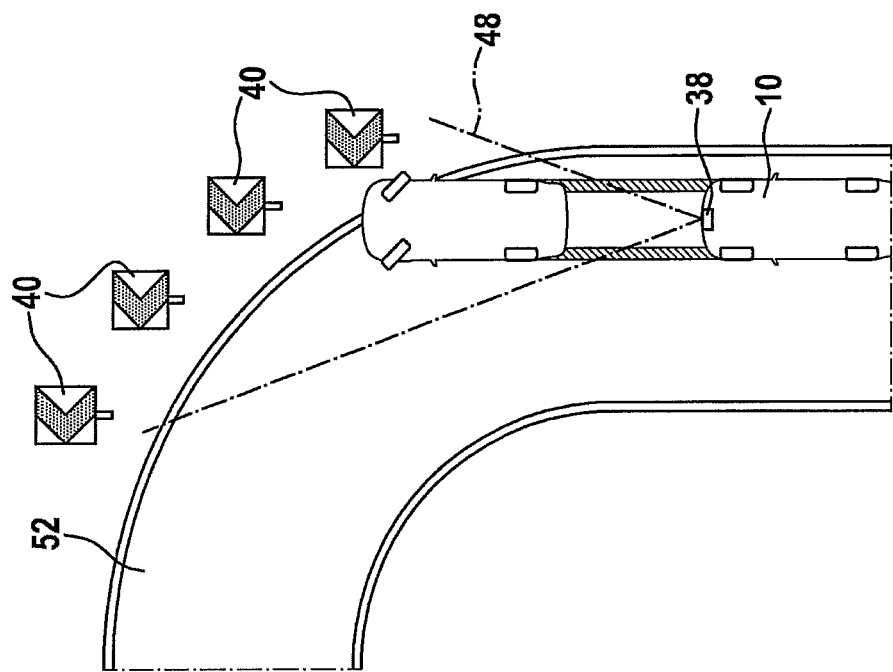
FIGS. 2A and 2B show a first driving situation in which the control system illustrated in FIG. 1 is employed.

Control system 16 now also has at least one surroundings detection device 38 for detecting objects 40 (illustrated in FIGS. 2 and 3) in the surroundings of vehicle 10, a device 42 for determining the possibility or probability of damage due to an interaction between vehicle 10 and a detected object 40 in the vehicle surroundings, and a device 44 for changing the intensity of a control intervention by the vehicle dynamics control system as a function of the probability of the interaction between vehicle 10 and object 40. This device 44 is in particular an activation and/or a deactivation device for automatically activating or for automatically deactivating the vehicle dynamics control system. In the example of FIG. 1, control unit 30 integrally has device 42 and device 44.

Surroundings detection device 38 shown is a sensor directed ahead of a radar system 46 having a certain detection area 48. Sensor 46 is installed in the front area of vehicle 10. Detection area 48 of the sensor directed ahead is a detection area 48 which is directed in the forward direction of vehicle 10. It is furthermore conceivable to also have other surroundings detection devices 38 which are based on other measuring principles and/or detect other areas of the vehicle surroundings.

Another user interface 50 is configured as a selection device for selecting the operating mode of control system 16 for controlling the vehicle dynamics from multiple selectable operating modes.

Surroundings detection device 38 and device 42 for determining the probability of damage due to an interaction between vehicle 12 and a detected object 40 are, for example, part of a driver assistance system of vehicle 10.

The dynamics control system (DCS) of vehicle 10 supports the driver of vehicle 10 by ensuring an increased lane stability of vehicle 10, i.e., by suppressing a drifting or an under- or oversteering.

Drifting refers to a driving state in which vehicle 10 moves laterally to its own longitudinal axis while negotiating a curve, thus resulting in great slip angles at both axes. A mainly rear-wheel drifting is generally also referred to as oversteering. This means that after the breakaway of the vehicle rear, the steering is to be straightened or the vehicle is even to be steered in the direction of the outside of the curve. A mainly front-wheel drifting is referred to as understeering. This means that the steering angle is more acute than the curve radius of the road profile would actually require.

In some situations, it is desired, however, to allow drifting of vehicle 10. These are, however, generally those driving situations in which a collision risk is very small or may even be excluded.

When a hazardous situation occurs, it is often desirable that the vehicle dynamics control system (DCS) is turned on automatically, i.e., not manually by the intervention of the driver or another occupant of vehicle 10.

The following function results:

The starting situation is either a previously activated vehicle dynamics control system or a previously deactivated vehicle dynamics control system.

Control system 16 for dynamics control of vehicle 10 is operated as follows in a corresponding operating mode:

Surroundings detection device 38 permanently detects the surroundings of vehicle 10 or a detection area 48 of surroundings detection device 38 in the surroundings, while vehicle 10 is driving. If, in the process, surroundings detection device 38 detects an object 40 (FIGS. 2B and 3B) in its detection area 48, system 16 determines the probability of an interaction, between vehicle 10 and this object 40, to cause damage to vehicle 10 or its occupants. Subsequently, the vehicle dynamics control system is automatically activated or deactivated to prevent a lateral breakaway of vehicle 10 as a function of the previously determined probability of an interaction between vehicle 10 and object 40 in the operating mode "automatically turning on/automatically turning off the vehicle dynamics control" of control system 16.

This operating mode may be a general or an optional operating mode. If an optional operating mode is involved, the driver or another occupant of vehicle 10 selects the operating mode with automatic activation of the vehicle dynamics control system or with automatic deactivation of the vehicle dynamics control system from multiple selectable operating modes with the aid of user interface 50. Other operating modes may, for example, be an operating mode with a permanently turned-off vehicle dynamics control system or an operating mode with a permanently turned-on vehicle dynamics control system.

If the vehicle dynamics control system is turned on, a control intervention takes place as a function of the variables measured by sensor 36 which detect the actual driving behavior of vehicle 10 (yaw rate, transverse acceleration, etc.).

If the vehicle dynamics control system is turned off, a control intervention does not take place regardless of the variables measured by sensor 36. This situation is shown in FIG. 2A.

Figure 2A:
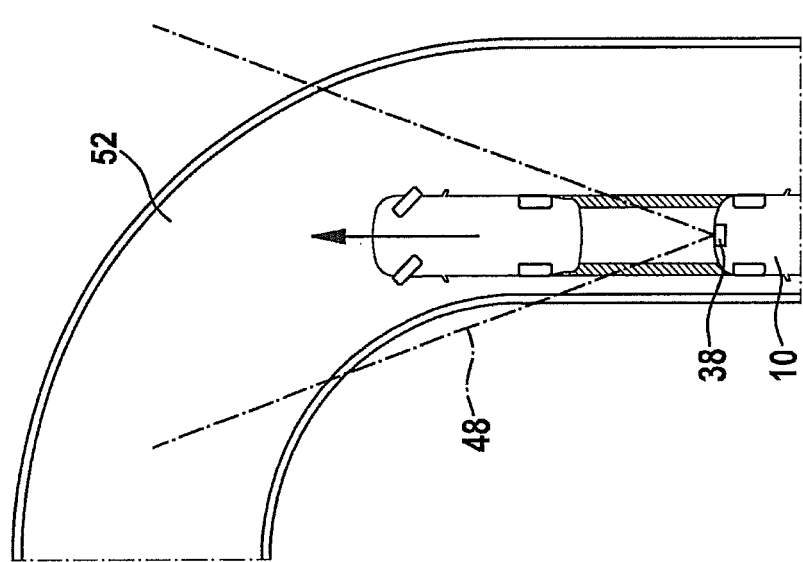

FIG. 2A shows a typical driving situation in which an understeering of vehicle 10 results without vehicle dynamics control. Vehicle 10 drives towards curve 52 and vehicle 10 starts understeering due to the parameters (speed, steering angle, . . . /friction values, tire pressures, . . . ) selected by the driver/provided from the surroundings.

If surroundings detection device 38 is initially not able to recognize an immediate collision risk due to the understeering for vehicle 10, the DCS interventions by control system 16 are suppressed (FIG. 2A: understeering in the case of a sufficiently large roll-out zone).

If, however, a collision is imminent due to understeering (FIG. 2B: potential collision with the traffic signs as recognized objects 40) or a situation which was initially not critical escalates, the situation is mitigated as a result of an intervention by control system 16.

Figure 3B:
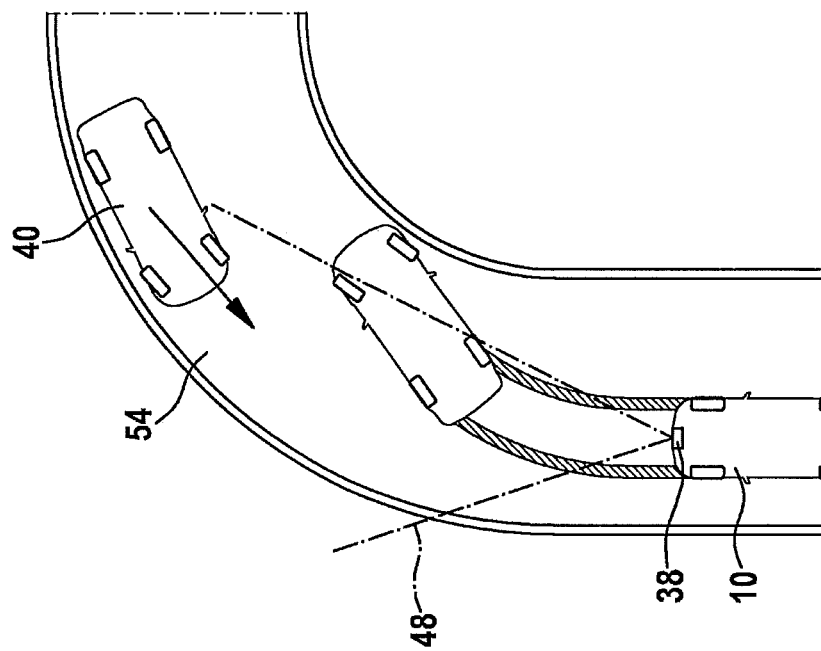
FIGS. 3A and 3B show a second driving situation in which the control system illustrated in FIG. 1 is employed.
Figure 3A:
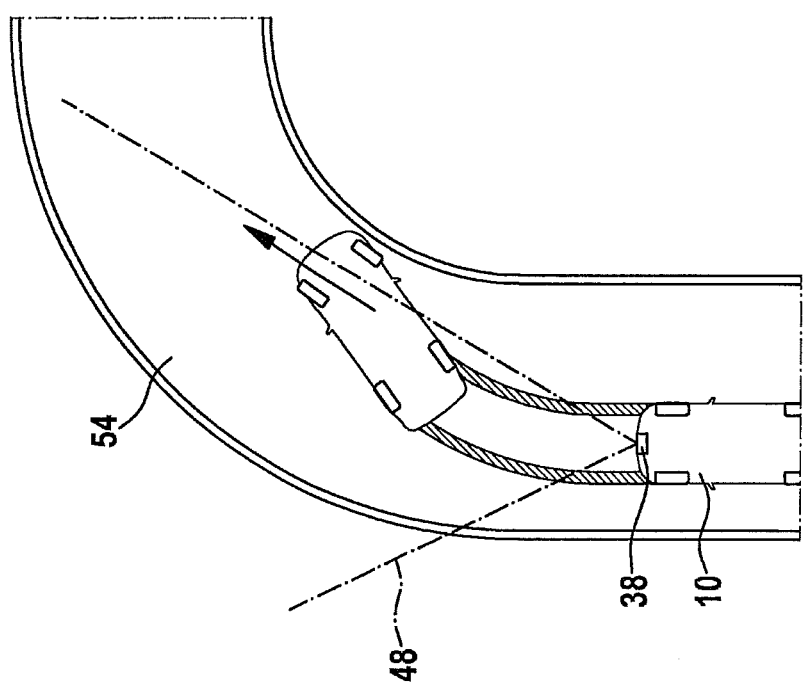

FIGS. 3A and 3B show a different driving situation: Vehicle 10 starts oversteering in a curve 54 or is already oversteering.

If due to the signals of surroundings detection device 38, an immediate risk is not recognizable (FIG. 3A: oversteering without immediate collision risk), DCS interventions do not take place.

If it is recognized that a collision risk with the oncoming traffic (as object 40) exists due to oversteering (FIG. 3B), dynamics control system DCS stabilizes vehicle 10 and thus reduces the collision probability with objects 40 which are recognizable by surroundings detection device 38.

What is claimed is:

1. A method for operating a control system for providing dynamic control of a vehicle, the method comprising:
    detecting an object with the aid of at least one surroundings detection device which detects a detection area in the vehicle surroundings;
    determining a probability of an interaction, which is between the vehicle and the object, to cause damage to the vehicle or an occupant, due to an understeering or an oversteering; and
    changing an intensity of a control intervention by the vehicle dynamics control system as a function of the previously determined probability of an interaction between the vehicle and the object in at least one operating mode of the control system, the vehicle dynamics control system being a vehicle dynamics control system for preventing a lateral breakaway of the vehicle.

2. The method of claim 1, wherein the change in the intensity of the control intervention by the vehicle dynamics control system includes automatically activating or deactivating this vehicle dynamics control system.

3. The method of claim 1, wherein the detection of the object includes an ascertainment of at least one of a position, a speed and an acceleration of the object relative to the vehicle.

4. The method of claim 1, wherein the surroundings detection device includes at least one of a visual and an acoustic sensor, which is a sensor of a radar system, a sensor of an infrared vision system, a camera of a video system and a sensor of an ultrasonic system.

5. The method of claim 1, wherein the surroundings detection device includes a surroundings detection device of a driver assistance system of the vehicle.

6. The method of claim 1, wherein the determination of the probability of an interaction between the vehicle and the object is a determination of the probability of an interaction between the vehicle and the object, and wherein the change in the intensity of the control intervention by the vehicle dynamics control system takes place as a function of a preselected probability threshold.

7. The method of claim 1, wherein the driver of the vehicle selects the at least one operating mode from multiple selectable operating modes.

8. A control unit for operating a control system for providing dynamic control of a vehicle, comprising:
    a determining arrangement to determine a probability of an interaction, between the vehicle and an object detected in the vehicle surroundings, to cause damage to the vehicle or an occupant, due to an understeering or an oversteering, wherein the object is detected with the aid of at least one surroundings detection device which detects a detection area in the vehicle surroundings; and an intensity arrangement to change an intensity of a control intervention by the vehicle dynamics control system as a function of the probability of the interaction between the vehicle and the object in at least one operating mode of the control system, the vehicle dynamics control system being a vehicle dynamics control system for preventing a lateral breakaway of the vehicle.

9. A control system for providing dynamic control of a vehicle, comprising:

at least one surroundings detection device to detect a detection area in a vehicle surroundings for detecting an object;

a probability arrangement to determine a probability of an interaction, between the vehicle and the object, to cause damage to the vehicle or an occupant, due to an understeering or an oversteering; and an intensity arrangement to change the intensity of a control intervention by the vehicle dynamics control system as a function of the probability of the interaction between the vehicle and the object in at least one operating mode of the control system, the vehicle dynamics control system being a vehicle dynamics control system for preventing a lateral breakaway of the vehicle.

10. The system of claim 9, wherein the surroundings detection device includes at least one of a visual and an acoustic sensor, which includes at least one of a sensor of a radar system, a sensor of an infrared vision system, a camera of a video system and a sensor of an ultrasonic system.

11. The system of claim 9, further comprising:

a selection device to select an operating mode from multiple selectable operating modes.

* * * * *